United States Patent
Adachi et al.

(10) Patent No.: US 6,519,526 B1
(45) Date of Patent: Feb. 11, 2003

(54) METHOD OF UPDATING REGISTERED INFORMATION IN DIGITAL MAP

(75) Inventors: Shinya Adachi, Kanagawa (JP); Satoko Miyama, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/075,827

(22) Filed: Feb. 14, 2002

(51) Int. Cl.[7] .............................................. G01C 21/30
(52) U.S. Cl. ...................................... 701/208; 701/209
(58) Field of Search ............................... 701/207, 208, 701/201, 210, 209, 212, 213, 214; 340/990, 995

(56) References Cited

U.S. PATENT DOCUMENTS

| | | | |
|---|---|---|---|
| 6,381,536 B1 | * | 4/2002 | Satoh et al. ................. 701/207 |
| 6,385,534 B1 | * | 5/2002 | Yoshimura et al. ......... 701/308 |
| 6,334,087 B1 | * | 8/2002 | Nakano et al. .............. 701/208 |
| 6,430,499 B1 | * | 8/2002 | Nakano et al. .............. 701/208 |

FOREIGN PATENT DOCUMENTS

| | | |
|---|---|---|
| WO | WO 00/08616 | 2/2000 |

* cited by examiner

*Primary Examiner*—Richard M. Camby
(74) *Attorney, Agent, or Firm*—Pearne & Gordon LLP

(57) ABSTRACT

This invention provides a method of updating registered information when an old digital map is updated to a new digital map. In the method, coordinate series data representing a shape of a road around a registration point on the old map are acquired from a data base of the old map, a positional relationship between a reference point included in the shape of the road and the registration point is obtained, shape matching is carried out on the new map by using the coordinate series data to obtain a shape of a road on the new map corresponding to the shape of the road, and a reference point on the new map corresponding to the reference point is acquired from the shape of the road thus obtained, thereby specifying the registration point on the new map based on a positional relationship with the reference point on the new map.

8 Claims, 8 Drawing Sheets

FIG. 3

COORDINATE SERIES DATA

| |
|---|
| TOTAL NUMBER OF NODES 9 |
| NODE NUMBER p2 |
| LONGITUDE |
| LATITUDE |
| NODE NUMBER p3 |
| RELATIVE COORDINATE x3 |
| RELATIVE COORDINATE y3 |
| ⋮ |
| NODE NUMBER p10 |
| RELATIVE COORDINATE x10 |
| RELATIVE COORDINATE y10 |

FIG. 6 (a)

COORDINATE SERIES DATA

| TOTAL NUMBER OF NODES 9 |
| --- |
| NODE NUMBER p2 |
| LONGITUDE |
| LATITUDE |
| NODE NUMBER p3 |
| RELATIVE COORDINATE x3 |
| RELATIVE COORDINATE y3 |
| ⋮ |
| NODE NUMBER p10 |
| RELATIVE COORDINATE x10 |
| RELATIVE COORDINATE y10 |

FIG. 6 (b)

ADDITIONAL INFORMATION

| ROAD KIND CODE (EXPRESSWAY, NATIONAL ROAD OR ETC.) |
| --- |
| ROAD NUMBER (NATIONAL ROAD 246 OR ETC.) |
| NUMBER OF CROSSING INFORMATION |
| NODE NUMBER p2 |
| NUMBER OF CONNECTION LINKS OF p2  4 |
| ANGLE OF CONNECTION LINK OF p2  d1 |
| ⋮ |
| ANGLE OF CONNECTION LINK OF p2  d4 |
| NODE NUMBER p5 |
| NUMBER OF CONNECTION LINKS OF p5  3 |
| ANGLE OF CONNECTION LINK OF p5  d1 |
| ⋮ |
| ANGLE OF CONNECTION LINK OF p5  d3 |
| ⋮ |

METHOD OF UPDATING REGISTERED INFORMATION IN DIGITAL MAP

BACKGROUND OF THE INVENTION

1. Field of the Invention

The present invention relates to a method of updating registered information for updating and re-registering the registered information on an updated digital map. The registered information includes information about an institution, piping, an electric wire, and so on. More particularly, the method is capable of mechanically carrying out a registration processing without assistance.

2. Description of the Related Art

Conventionally, gas companies and electric power companies have introduced a geographic information system (GIS) for managing by registering positions of gas pipes and power lines which are provided, and relay and maintenance institutions, on a digital map. Therefore, they have attempt to utilize the digital map.

In the case in which a basic drawing of digital map data is updated, data (coordinate point) on position information registered in an old digital map cannot be simply copied onto a new digital map. Then, it is necessary to re-register the data with confirmation of the relationship between a road in the old map and that in the new map.

The data on the digital map include an error caused by being reduced scale. Therefore, the confirmation work is required. For example, a map of 1/25000 includes an error of approximately 50 m depending on a place. Such an error has gradually been corrected with the advancement of a measuring technique. For this reason, in many cases in which the digital map is updated, the position of a road on the old map is moved by several tens meters on the new map.

FIGS. 8(a), (b), and (c) typically show the above state. FIG. 8(a) shows a positional relationship between data on a road in an old map and a registered institution A. A white circle on the road indicates a position of a node on digital map data. The node is a point on the road and is set corresponding to an intersection, the entry and exit of a tunnel, the entry and exit of a bridge, and the boundary of an administrative district. Moreover, a black circle on the road indicates an interpolation point and is set to reproduce the shape of the road (link) between the nodes.

When the basic drawing of the digital map data is updated and the position of the road is changed as shown in a dotted line of FIG. 8(b), the institution A positioned on the left side of a road in an old map is moved to the right side of the road if data on the position are simply copied onto a new map. As shown in FIG. 8(c), thus, it is necessary to carry out a processing of a re-registering, in a correct position on the road in the new map, registered information which has the positional relationship with the road changed by the update of the digital map data.

A work for reviewing registered information with the update of the digital map has conventionally been carried out manually and a large number of workers have performed the work by taking a long time.

SUMMARY OF THE INVENTION

In order to solve such a conventional problem, it is an object of the invention to provide a method of updating registered information in a digital map which can be processed mechanically.

The invention provides a method of updating registered information on an old map to be re-registered on a new map when the old map is updated to the new map, including the steps of acquiring coordinate series data representing a shape of a road around a registration point on the old map from a data base of the old map, thereby obtaining a positional relationship between a reference point included in the shape of the road and the registration point, and carrying out shape matching on the new map by using the coordinate series data, obtaining a shape of a road on the new map corresponding to the shape of the road, acquiring a reference point on the new map corresponding to the reference point from the shape of the road thus obtained, and specifying the registration point on the new map based on a positional relationship with the reference point on the new map.

Therefore, the registration point on the new map can be specified mechanically even if a person does not decide the same registration point.

BRIEF DESCRIPTION OF THE DRAWINGS

FIG. 3 shows a data structure of coordinate series data in the updating method of registered information according to the first embodiment of the invention.

FIGS. 6(a) and (b) show data structures of coordinate series data and additional information in the updating method of registered information according to the second embodiment of the invention.

DETAILED DESCRIPTION OF THE PREFERRED EMBODIMENTS

First Embodiment

By taking, as an example, the case in which an institution registered in an old map is re-registered on a new map updated on an equal scale according to a first embodiment, a method of updating registered information according to the invention will be described.

Figure 1:
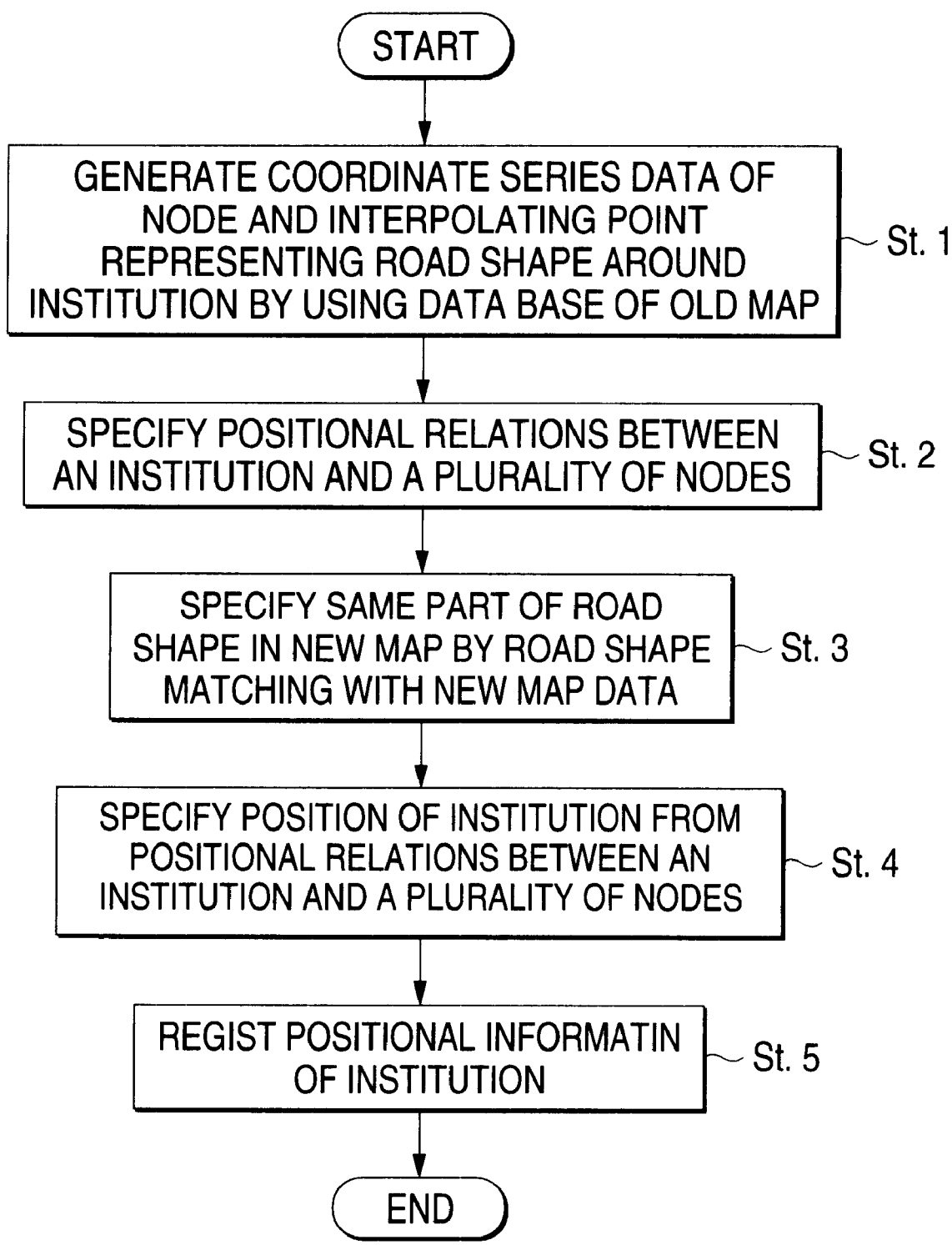
FIG. 1 is a flow chart showing a procedure for a method of updating registered information according to a first embodiment of the invention.
Figure 2:
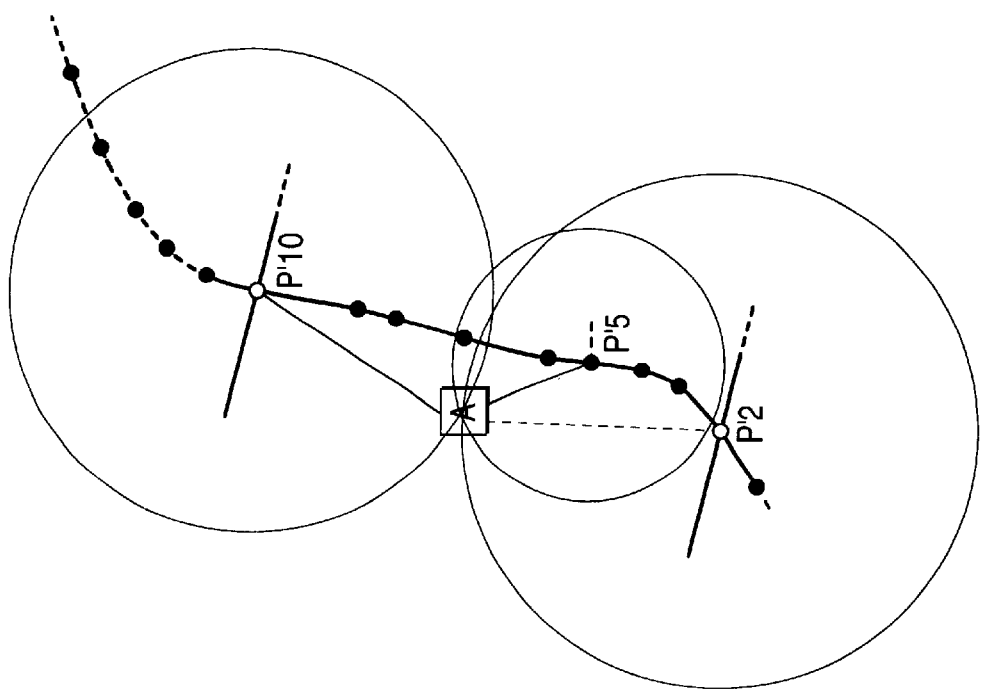
FIGS. 2(a) and (b) illustrate the procedure for the updating method of registered information according to the first embodiment of the invention.
Figure 2:
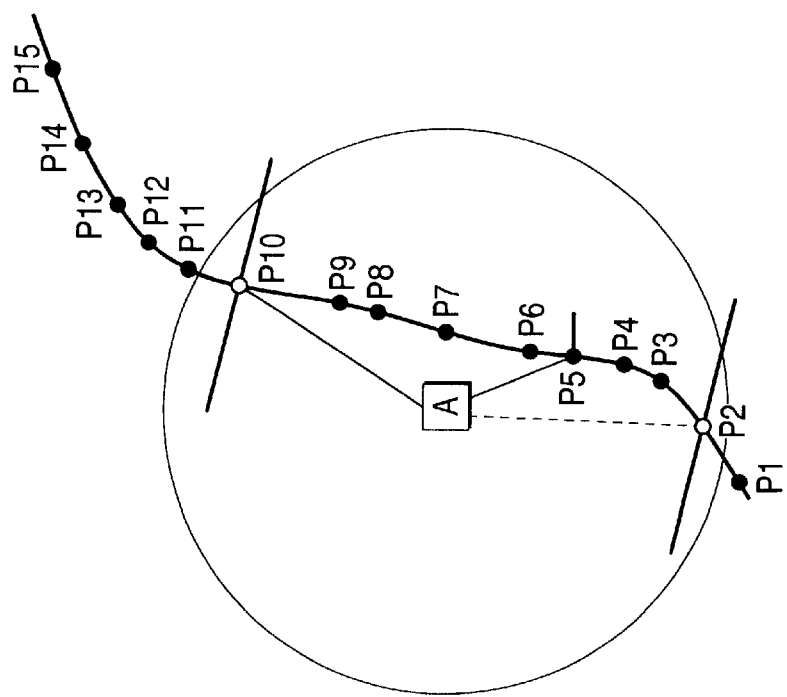

FIG. 1 shows a procedure for the updating method. With reference to FIG. 2, the procedure will be described.

As shown in FIG. 2(a), it is assumed that an institution A is registered in an old map. P1 to P15 indicate positions of a node and an interpolation point on a road in the vicinity of the institution A which are included in an old map data base. P2, P5 and P10 denote the note and others denote the interpolation point.

First of all,

Step 1: Coordinate series data on the node and the interpolation point which represent the shape of the road in the vicinity of the institution A are generated from the old map data base.

As shown in FIG. 2(a), coordinate data (longitude and latitude data) on the nodes and interpolation points P2 to P10 on the road within a predetermined radius from the institution A are acquired from the old map data base and are arranged in order to generate coordinate series data as shown in FIG. 3. The coordinate series data represent the shape of the road in the vicinity of the institution A. In the coordinate series data, coordinates of a first point (P2) are represented by the longitude and the latitude and coordinates of second and succeeding points (P3 to P10) are represented by relative coordinates for P2 (or a last point). Thus, display is carried out by using the relative coordinates so that a data volume can be decreased.

Step 2: Next, a distance between three nodes P2, P5 and P10 included in the shape of the road in the vicinity of the institution A and the institution A is calculated. If the positions of the nodes are decided on a new map by acquiring the positional relationship between the nodes and the institution A, thus, the position of the institution A is determined.

Step 3: Subsequently, the coordinate series data (FIG. 3) obtained at the step 1 are used to carry out matching of a road shape with new map data, thereby searching the same road shape in the new map.

Figure 7:
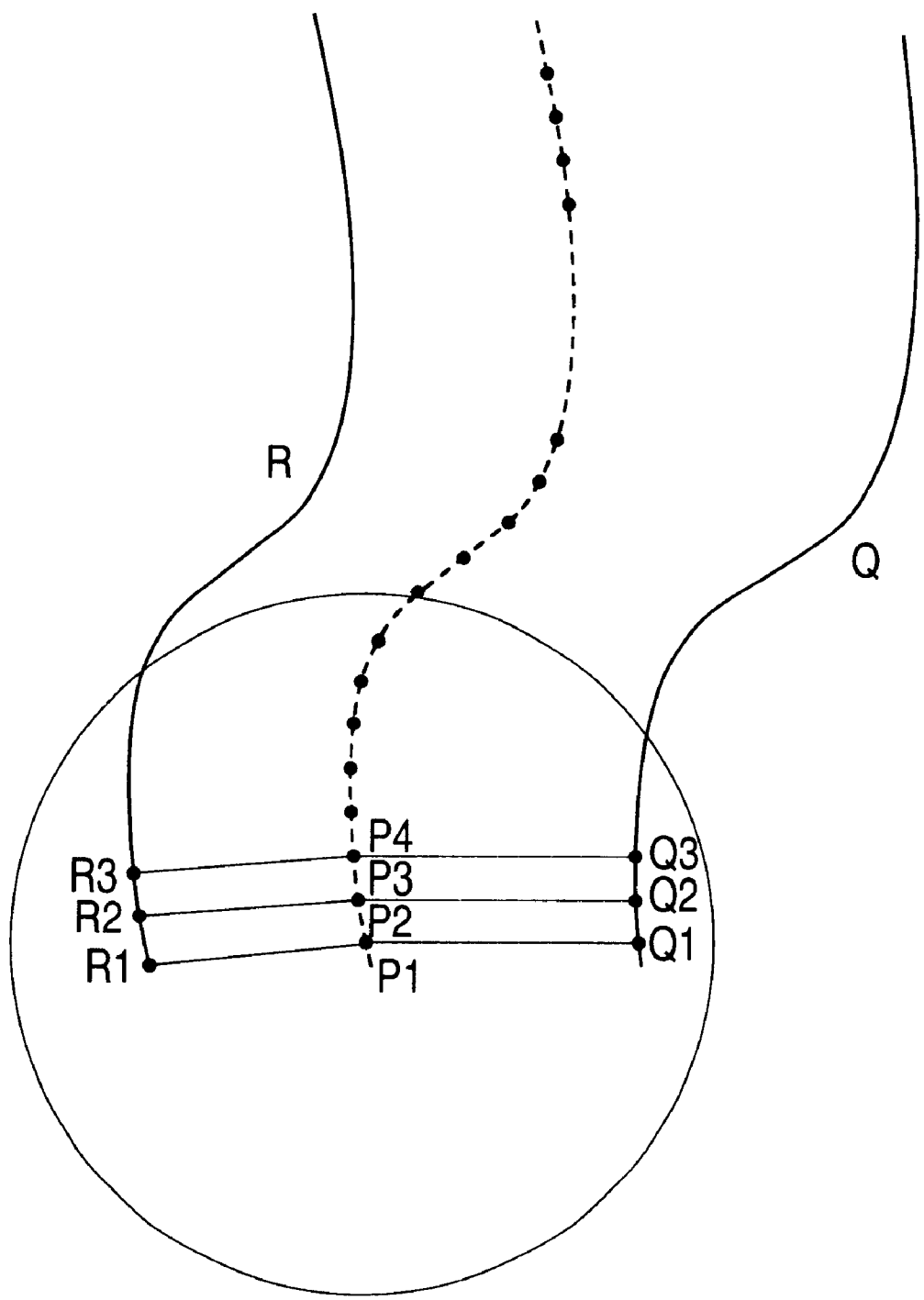
FIG. 7 illustrates an example of shape matching.
Figure 8:
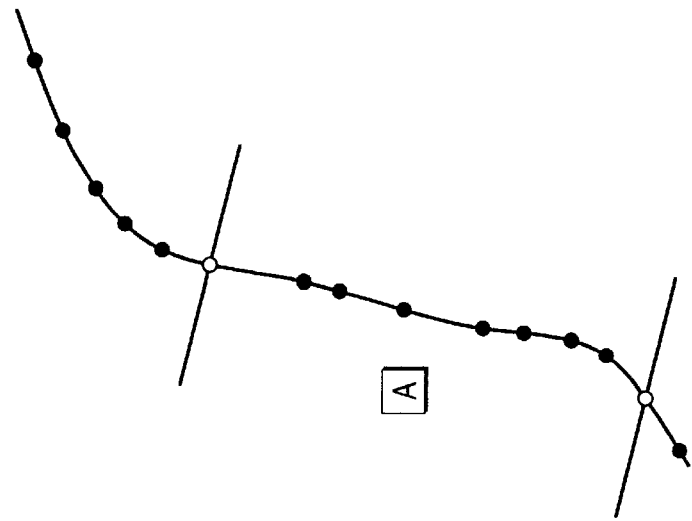
FIGS. 8(a), (b), and (c) illustrate the necessity of review of the registered information with the update of a digital map.
Figure 8:
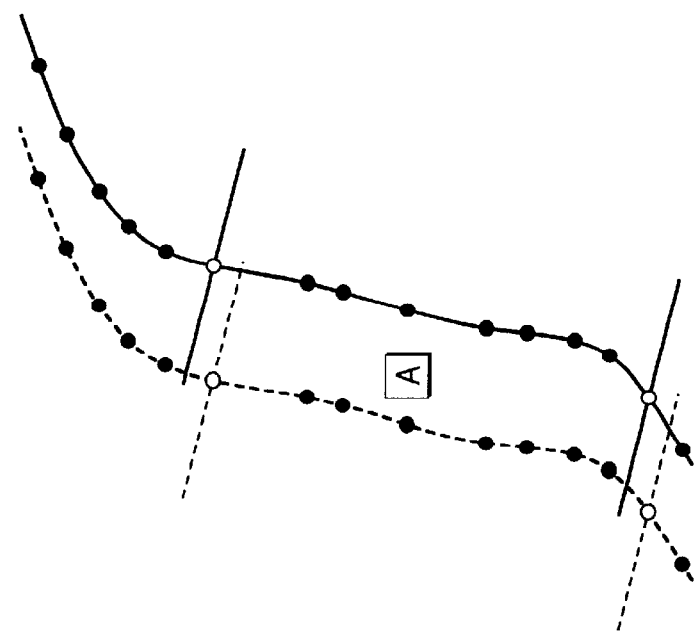
Figure 8:
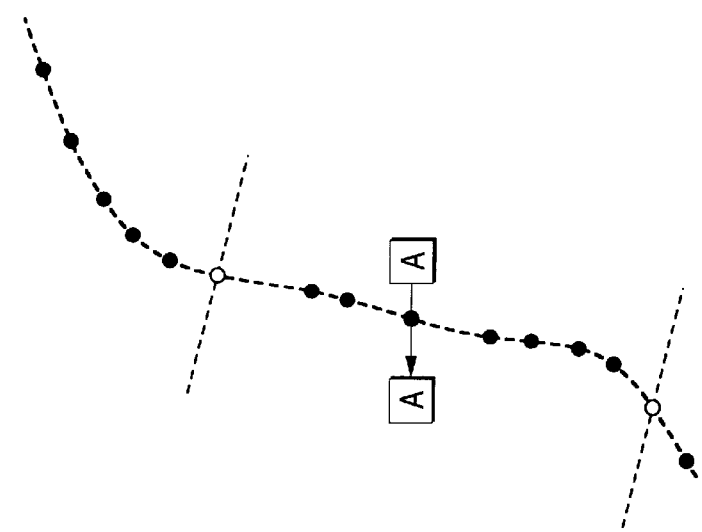

FIG. 7 shows an example of the road shape matching.

First of all, selection is carried out by using, as candidates, roads Q and R included in the range of an error around the point P2 of the new map data.

Next, positions Q2 and R2 on each candidate road which are the closest to P2 are obtained to calculate distances between P2 and Q2 and between P2 and R2.

This operation is carried out for each of the points P3, ..., P10 to obtain a road shape in which an added value of a root mean square of distances from the points P2, P3, ..., P10 is a minimum.

Step 4: Next, nodes P'2, P'5 and P'10 corresponding to the nodes P2, P5 and P10 used for positioning in the step 2 are obtained from the road shapes of the new map acquired at the step 3 (FIG. 2(b)). Then, a position set apart from the nodes P'2, P'5 and P'10 by a distance equivalent to the distance from each node at the step 2 is specified as the position of the institution A, and Step 5: Information about the position is registered.

Thus, the same road shape as the road shape in the old map is searched on the new map and a point corresponding to a reference point on the old map is specified on the new map. By similarly acquiring, on the new map, the positional relationship between the reference point and the institution on the old map, the position of the institution on the new map can be specified.

While three nodes are used for the reference point to obtain the distance from each reference point and to position the institution A, two reference points are enough if the relationship of a distance and an angle between the reference point and the institution A is set to satisfy the congruent conditions of a triangle when the new map is to be updated on an equal scale to the scale of the old map. In the case in which the new map is to be updated on a different scale from the scale of the old map, moreover, it is possible to specify a position on the new map by setting the positional relationship between the reference point and the institution A by using the similar conditions of a triangle.

Furthermore, while description has been given to the case in which the point of the institution is to be specified on the new map, the point is not restricted but it is also possible to specify the position of a face or a line on the new map by specifying a plurality of points included in the face or the line.

Second Embodiment

In a second embodiment, description will be given to a method of searching, on a new map, the same road shape as a road shape of an old map with high precision.

In this method, a road type, a road number or detailed information about an intersection node which is previously present in a digital map data base as well as information about a coordinate series of a node and an interpolation point are utilized as additional information in order to enhance precision in search.

Figure 5:
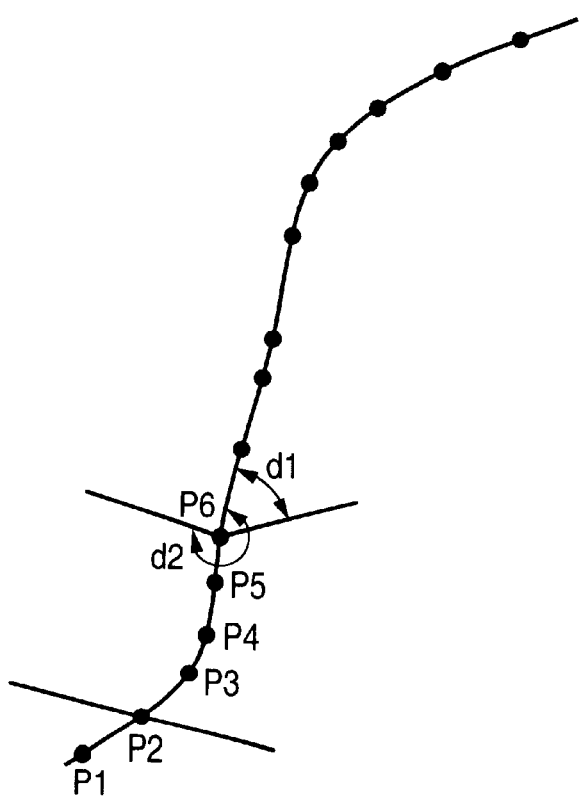
FIGS. 5(a) and (b) illustrate additional information to be used in the method according to the second embodiment of the invention.
Figure 5:
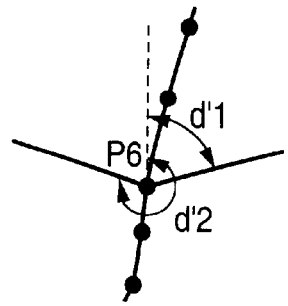

This road type is information to distinguish a thruway, a national road and a main local road. The road number is a number affixed to a road such as a national road No. 246. The detailed information about the intersection node includes the number of links to be connected to the node and the angle of the link to be connected. The number of links on an intersection node $P_6$ in FIG. 5(a) is 4, and furthermore, the connecting link angle is represented by angles $d_1$ and $d_2$ formed between the links. In some cases, moreover, the connecting link angle is represented by angles $d'_1$ and $d'_2$ from a true north (a dotted line) of each link as shown in FIG. 5(b).

Moreover, the name of an intersection can be added to the additional information in the case of the intersection node and information about the node representing the entry and exit of a tunnel, the entry and exit of a bridge and the boundary of an administrative district can be added to the additional information.

Figure 4:
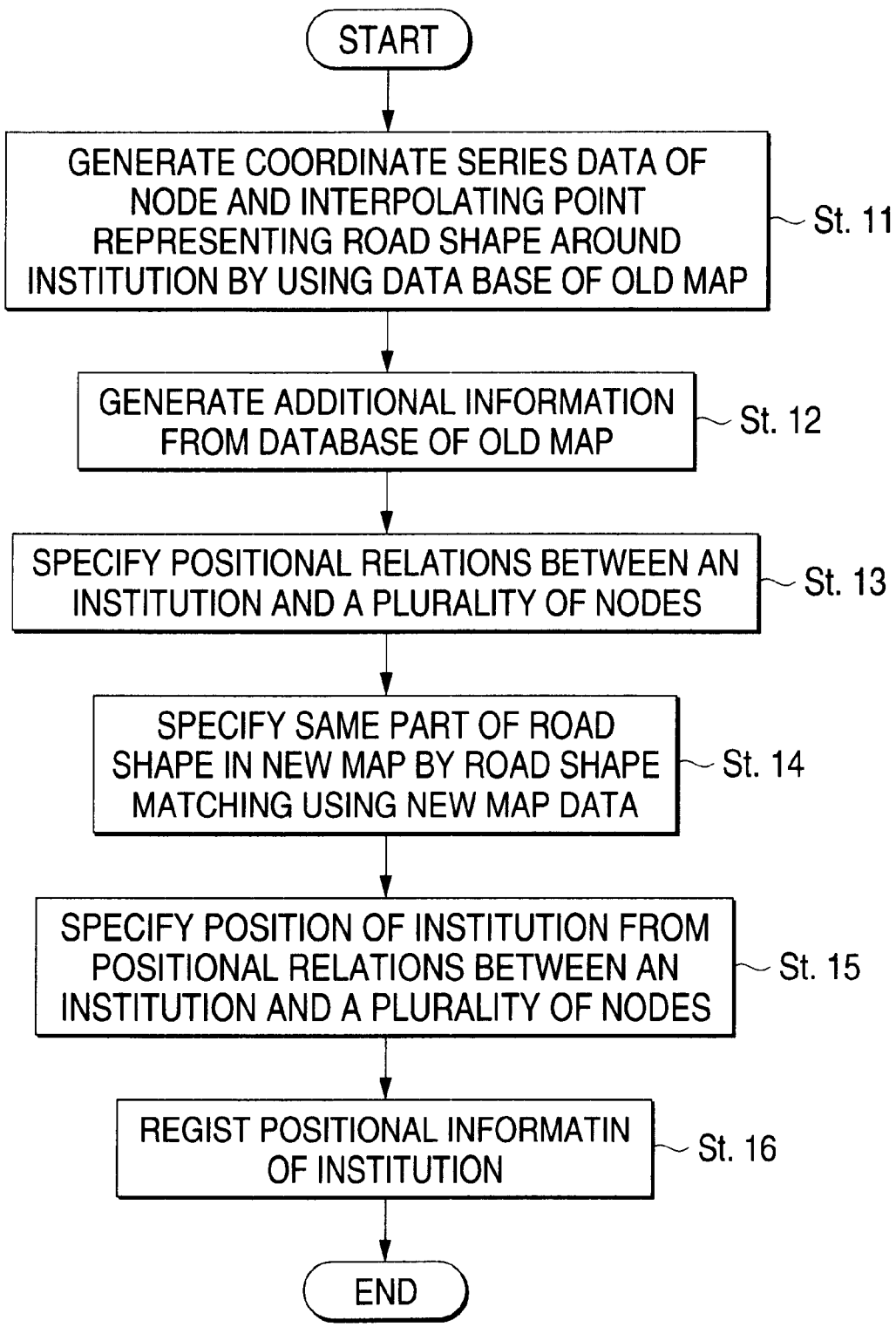
FIG. 4 is a flow chart showing a procedure for a method of updating registered information according to a second embodiment of the invention.

FIG. 4 shows a procedure for the method according to the second embodiment. While the procedure is basically the same as that in the first embodiment (FIG. 1), there is a difference in that additional information is generated by using data of an old map data base at a step 12.

FIG. 6 illustrates a data structure of additional information (b) generated together with coordinate series information (a). Referring to the additional information, a road type code in a road, a road number, an intersection information number indicating the number of intersection nodes included in the additional information are displayed in the additional information. Referring to the intersection node, furthermore, a node number to be linked to coordinate series information, the number of connecting links of the intersection node, a connecting link angle of a first connecting link of the intersection node, ..., and a connecting link angle of an nth connecting link of the intersection node are displayed for each intersection node, respectively.

By using the coordinate series data and the additional information, the road shape matching of the new map is carried out to search, on the new map, the same road shape as the road shape of the old map (step 14).

The road shape matching can be carried out by using the method shown in FIG. 7 described above. In this case, it is possible to limit a candidate road based on a road type code and a road number in the additional information. Moreover, in the case in which positions Qk and Rk on each candidate road corresponding to a position Pk having each node number of the node column information are to be obtained, a collation with the intersection information of an intersection positioned in the vicinity of Qk and Rk is carried out when Pk is the intersection node, and a road having no coincidence can be removed from the candidate. Thus, a corresponding road section can be obtained rapidly with high precision.

By thus utilizing the additional information together, it is possible to precisely grasp the same road shape on the new map even if the data volume of the coordinate series is decreased, that is, the radius in FIG. 2(a) is reduced.

As is apparent from the description, according to the invention, in the case in which the digital map is updated, the information registered in the old map can be re-registered mechanically on the new map.

Consequently, it is possible to relieve the burden of an operator to carry out a work for reviewing the registered information with the update of the digital map.

What is claimed is:

1. A method of updating registered information to be re-registered when an old digital map is updated to a new digital map, the method comprising the steps of:

acquiring coordinate series data representing an old shape of a road around an old registration point on the old digital map from a data base of the old digital map, wherein the shape of the road includes an old reference point;

obtaining a positional relationship between the old reference point and the old registration point;

carrying out shape matching on the new digital map by using the coordinate series data;

obtaining a new shape of a road on the new digital map corresponding to the old shape of the road on the old digital map;

obtaining a new reference point on the new digital map corresponding to the old reference point from the new shape of the road thus obtained; and specifying the new registration point on the new digital map based on a positional relationship with the new reference point on the new map.

2. The method according to claim 1, wherein the shape of the road further includes nodes and interpolation points, and further comprising the step of:

generating the coordinate series data by arranging coordinate data of the nodes and the interpolation.

3. The method according to claim 2, further comprising the step of:

selecting one of the nodes as a new reference point.

4. The method according to claim 2, wherein, in the step of acquiring coordinate series data, additional information is further acquired from the old data base of the old map, and wherein, in the step of carrying out shape matching, both of the coordinate series data and the additional information are utilized for shape matching, and wherein the additional information includes at least one of attribute information about the road and detailed information about the node of the shape of the road.

5. The method according to claim 2, wherein the coordinate series data is represented with such a manner that the coordinate data of one of the nodes and the interpolation points are represented by absolute coordinates and the coordinate data of a rest nodes and interpolation points are represented by relative coordinates.

6. The method according to claim 4, wherein the additional information includes at least one of information about a road type code, a road number, the number of connecting links in an intersection node, and a connecting angle of the connecting link in the intersection node.

7. The method according to claim 3, wherein, in the step of acquiring coordinate series data, additional information is further acquired from the old data base of the old map, and wherein, in the step of carrying out shape matching, both of the coordinate series data and the additional information are utilized for shape matching, and wherein the additional information includes at least one of attribute information about the road and detailed information about the node of the shape of the road.

8. The method according to claim 7, wherein the additional information includes at least one of information about a road type code, a road number, the number of connecting links in an intersection node, and a connecting angle of the connecting link in the intersection node.

* * * * *